US007054855B2

(12) United States Patent
Basso et al.

(10) Patent No.: US 7,054,855 B2
(45) Date of Patent: May 30, 2006

(54) METHOD AND SYSTEM FOR PERFORMING A PATTERN MATCH SEARCH FOR TEXT STRINGS

(75) Inventors: Claude Basso, Raleigh, NC (US); Jean Louis Calvignac, Cary, NC (US); Philippe Damon, Carrboro, NC (US); Gordon Taylor Davis, Chapel Hill, NC (US); Marco C. Heddes, Cary, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/898,253

(22) Filed: Jul. 3, 2001

(65) Prior Publication Data

US 2003/0009453 A1    Jan. 9, 2003

(51) Int. Cl.
*G06F 17/30* (2006.01)
(52) U.S. Cl. ............................ 707/3; 707/101; 709/203
(58) Field of Classification Search .................... 707/3, 707/4, 101; 709/203
See application file for complete search history.

(56) References Cited

U.S. PATENT DOCUMENTS

| 5,668,988 | A |   | 9/1997 | Chen et al. |
| 5,794,177 | A | * | 8/1998 | Carus et al. .................... 704/9 |
| 5,855,020 | A |   | 12/1998 | Kirsch |
| 5,864,863 | A |   | 1/1999 | Burrows |
| 5,897,637 | A | * | 4/1999 | Guha ........................ 707/101 |
| 6,006,264 | A |   | 12/1999 | Colby et al. |
| 6,012,074 | A | * | 1/2000 | Lucas et al. ................ 715/531 |
| 6,021,409 | A |   | 2/2000 | Burrows |
| 6,052,683 | A | * | 4/2000 | Irwin ............................ 707/8 |
| 6,055,538 | A |   | 4/2000 | Kessenich et al. |
| 6,092,100 | A |   | 7/2000 | Berstis et al. |
| 6,134,553 | A | * | 10/2000 | Jacobson et al. ............. 707/10 |
| 6,266,706 | B1 | * | 7/2001 | Brodnik et al. ............. 709/242 |
| 6,338,082 | B1 | * | 1/2002 | Schneider ................... 709/203 |

(Continued)

FOREIGN PATENT DOCUMENTS

EP        0537894 A2    4/1993

(Continued)

OTHER PUBLICATIONS

U.S. Appl. No. 09/543,531, filed Apr. 6, 2000, Brian Mitchell Bass et al.

(Continued)

*Primary Examiner*—Mohammad Ali
*Assistant Examiner*—Cindy Nguyen
(74) *Attorney, Agent, or Firm*—Joscelyn G. Cockburn; Dillon & Yudell LLP

(57) ABSTRACT

A method and system for performing a pattern match search for a data string having a plurality of characters separated by delimiters. In accordance with the method of the present invention a search key is constructed by generating a full match search increment comprising the binary representation of a data string element, wherein the data string element comprises all characters between a pair of delimiters. The search key is completed by concatenating a pattern search prefix to the full match search increment, wherein the pattern search prefix is a cumulative pattern search result of each previous full match search increment. A full match search is then performed within a lookup table utilizing the search key. In response to finding a matching pattern within the lookup table, the process returns to constructing a next search key. In response to not finding a matching pattern, the previous full match search result is utilized to process the data string.

16 Claims, 4 Drawing Sheets

U.S. PATENT DOCUMENTS

| | | | |
|---|---|---|---|
| 6,377,945 B1 * | 4/2002 | Risvik ............................ | 707/3 |
| 6,418,441 B1 * | 7/2002 | Call ............................. | 707/10 |
| 6,463,440 B1 * | 10/2002 | Hind et al. ................. | 707/102 |
| 6,539,373 B1 * | 3/2003 | Guha ........................ | 707/102 |
| 6,564,254 B1 * | 5/2003 | Shoji et al. ................. | 709/217 |
| 6,594,697 B1 * | 7/2003 | Praitis et al. ............... | 709/225 |
| 6,654,741 B1 * | 11/2003 | Cohen et al. ................... | 707/6 |
| 6,675,163 B1 * | 1/2004 | Bass et al. ..................... | 707/6 |
| 6,735,670 B1 * | 5/2004 | Bronstein et al. ........... | 711/108 |
| 6,760,746 B1 * | 7/2004 | Schneider ................... | 709/203 |

FOREIGN PATENT DOCUMENTS

EP  0752674 A1  1/1997

OTHER PUBLICATIONS

U.S. Appl. No. 09/210,222, filed Dec. 10, 1998, Jean Louis Calvignac et al.

*SequeLink® ODBC Driver Reference for Windows 3.1x, DataDirect*, Aug. 1999, XP-002253957, Merant, Mountain View, California.

Fielding et al., *Hypertext Transfer Protocol—HTTP/1.1, Standards Track*, Jun. 1999, XP-002196143, The Internet Society.

Mockapetris, P., *Domain Names—Implementation and Specification*, XP002917155, Network Working Group.

* cited by examiner

METHOD AND SYSTEM FOR PERFORMING A PATTERN MATCH SEARCH FOR TEXT STRINGS

CROSS REFERENCE TO RELATED APPLICATIONS

The present application is related to the following copending U.S. patent applications: U.S. patent application Ser. No. 09/210,222 filed on Dec. 10, 1998, titled "Methods, Systems and Computer Program Products For Hashing Address Values"; and U.S. patent application Ser. No. 09/543,531 filed on Apr. 6, 2000, titled "Full Match (FM) Search Algorithm Implementation For A Network Processor". The above mentioned patent applications are assigned to the assignee of the present invention. The content of the cross referenced copending applications is hereby incorporated herein by reference.

BACKGROUND OF THE INVENTION

1. Technical Field

The present invention relates in general to pattern match searching for text strings, and in particular to a method and system within a data processing network for parsing text strings such that the efficiency of a pattern match search may be improved. More particularly, the present invention relates to efficiently performing incremental full match searches within a lookup table that cumulatively produce a longest prefix match result.

2. Description of the Related Art

Parsing of text strings is a common processing task requiring significant processor cycles. Within a network environment, an example of such parsing tasks is processing of Universal Resource Identifier (URI) strings. A URI is a compact string of characters for identifying an abstract or physical resource. A URI can be further classified as a locator, a name, or both. A Universal Resource Locator (URL) is a type of URI string that identifies resources via a representation of their primary access mechanism (e.g., their network "location"). URL addresses serve as the global addresses utilized by Web browsers to access documents and other resources on the Internet. As utilized herein, "the Internet" refers to the worldwide collection of networks that utilize the Transmission Control Protocol/Internet Protocol (TCP/IP) suite of protocols to communicate with one another. A URL specifies the protocol to be utilized in accessing a resource (such as http: for a World Wide Web page), the name of the server on which the resource resides (such as //www.ibm.com), and, optionally, the path to a particular resource (such as a hypertext markup language file) on the server. Encoded within each URL address string is the Internet Protocol (IP) address of the destination server.

Parsing of URI character strings, such as URL addresses, is often incorporated within pattern searching algorithms utilized by network processors. Such pattern search algorithms are utilized to find the longest matching binary sequence from a collection of stored binary strings. Specifically, such tasks require comparing an input search key to a data string that is stored in a database to find the longest match. The database that stores the data strings often includes a lookup table that, after establishing a match between an input search key and a data string within the database, either retrieves information or executes a program linked to the data string.

Pattern matching searches are utilized in packet-based communication networks to facilitate routing of packets among multiple interconnected nodes. Specialized nodes called routers are responsible for delivering or "forwarding" a packet to its destination in accordance with an IP destination address. IP currently supports a network routing protocol called IPv4 (Internet Protocol Version 4) that a 32-bit address in the header of each packet. For each packet received through an input link interface, a router reads the address field to determine the identity of the device (such as another router or host) to which the packet should be forwarded before reaching its final destination. Depending on the size of the network and its structure, the packet is either directly forwarded to its destination or sent to another router, very much the same way a letter is passed through several post offices until reaching its final address.

For Internet applications, a network processor determines the IP address of a destination server to which the packet is to be ultimately delivered by decoding a URL address. Network processors handle millions of packets per second, and thus must be capable of processing the URL strings very efficiently. Conventionally, URL strings are processed incrementally one byte at a time using a longest prefix match algorithm. The process continues to iterate as long as more than one stored URL prefix matches the corresponding piece of the URL string from the packet being processed. Once the process has eliminated all but one of the stored URL prefixes, the single remaining prefix is utilized to identify the desired destination address. After determining the optimum destination node, the router encodes the corresponding destination address into the address field of the packet and delivers the packet to a particular output link interface according to the encoded destination address. This method of URL processing lookup has become an increasingly critical delay bottleneck for Internet traffic.

It can therefore be appreciated that a need exists for an improved technique for parsing and processing a URI character string to efficiently determine a unique network resource. The present invention addresses such a need.

SUMMARY OF THE INVENTION

A method and system for performing a pattern match search for a data string having a plurality of alphanumeric characters separated by non-alphanumeric delimiters are disclosed herein. In accordance with the method of the present invention a search key is constructed by generating a full match search increment comprising the binary representation of a data string element, wherein the data string element comprises all characters between a pair of non-alphanumeric delimiters. The search key is completed by concatenating a pattern search prefix to the full match search increment, wherein the pattern search prefix is a cumulative pattern search result of each previous full match search increment. A full match search is then performed within a lookup table utilizing the search key. In response to finding a matching pattern within the lookup table, the process returns to constructing a next search key. In response to not finding a matching pattern, the previous full match search result is utilized to process the data string.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Although, the present invention will be described herein in terms of a particular system and particular components, one of ordinary skill in the art will readily recognize that this method and system will operate effectively for other components in a data processing system. The present invention will be described in the context of a network pattern search system wherein Universal Resource Indicator (URI) character strings are processed. However, one of ordinary skill in the art will readily recognize that the present invention is also applicable for any situation in which a pattern match search is to be conducted on a compact string of characters that together identify an abstract or physical resource.

Figure 1:
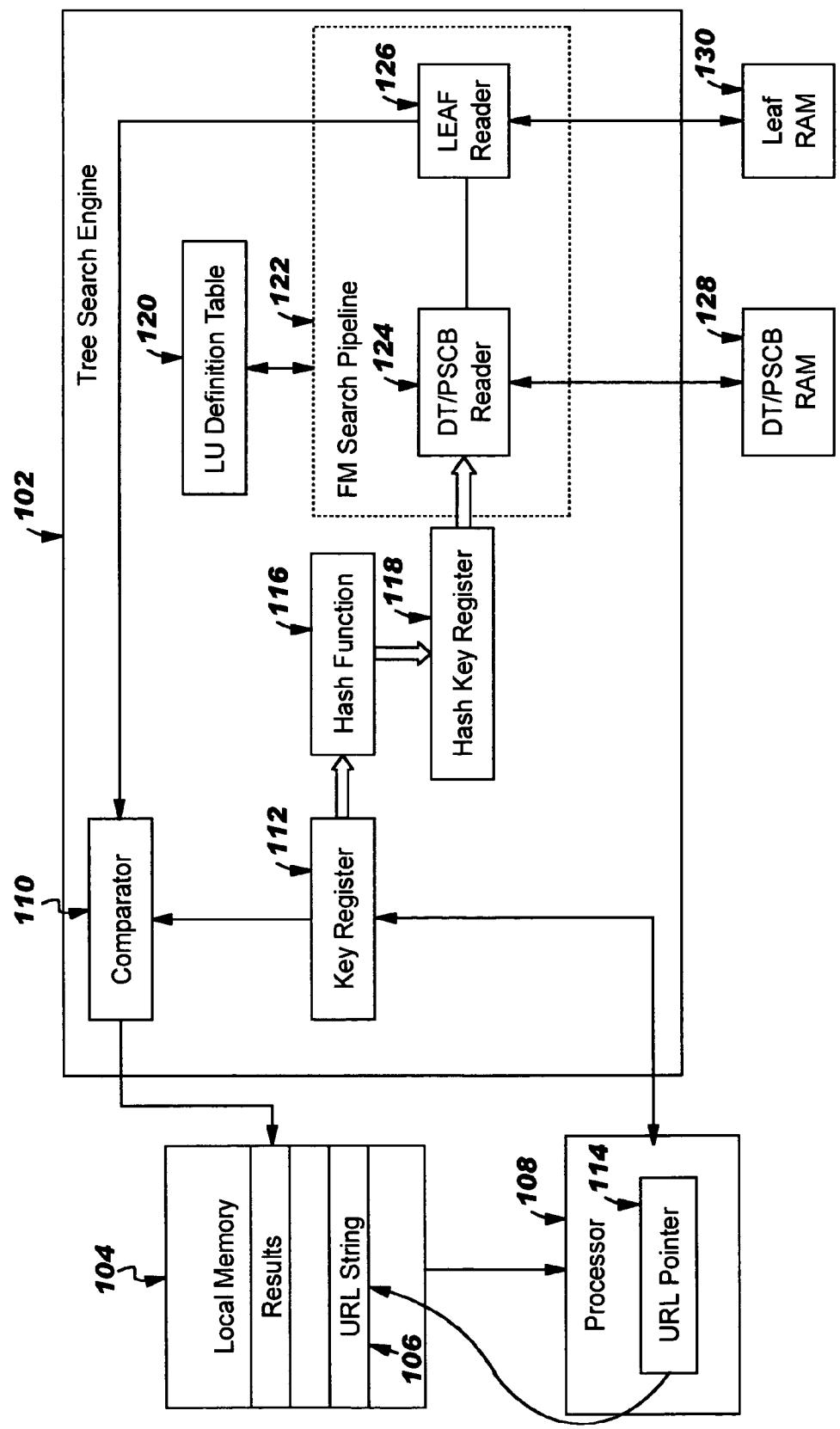
FIG. 1 is a block diagram illustrating a network processor including constituent elements of a tree search engine in accordance with one embodiment of the present invention.

With reference now to the figures wherein like reference numerals refer to like and corresponding parts throughout, and in particular with reference to FIG. 1, there is depicted a block diagram illustrating a network processor 100 in accordance with a preferred embodiment of the present invention. One or more processors 108 each having a local memory device 104 are included within the architecture of network processor 100 to address the demand for hardware-integrated processing that is required for supporting complex tasks at media speed. To this end, network processor 100 provides wirespeed packet processing and forwarding capability with function flexibility through a set of embedded, programmable protocol processors 108 and complementary system coprocessors. A tree search engine 102 is one such complementary coprocessor.

As a programmable communications integrated circuit, network processor 100 provides very efficient packet classification, multi-table lookups per packet, packet modification, queue/policy management, and other packet processing capabilities. The ability of network processor 100 to enforces hundreds of rules with complex range and action specifications makes it uniquely suited for high capacity server farm applications.

Although data ingress, data egress and other packet processing functionality is not shown in FIG. 1, one skilled in the art will clearly understand that such equipment is essential to and therefore presumably incorporated within the architecture of network processor 100. The present invention, as incorporated within the embodiment depicted in FIG. 1, provides an enhanced technique for processing URI character strings. As utilized herein, a URI is a compact string of characters for identifying an abstract or physical resource. A URI can be further classified as a locator, a name, or both. The term "Universal Resource Locator" (URL) refers to a subset of URI character strings that identify resources via a representation of their primary access mechanism (e.g., their network "location").

In accordance with the depicted embodiment, local memory device 104 stores a URL string 106 associated with an IP packet. Processor 108 includes a URL pointer 114 that permits processor 108 to scan URL string 106. Processor 108, together with URL pointer 114, performs reading and pointing operations with respect to URL string 106. URL pointer 114 may be a general purpose register within processor 108.

As depicted in FIG. 1, tree search engine 102 further comprises a key register 112 that holds a search key constructed from segments of URL string 106. The search key stored within key register 112 is utilized to index into a direct table within a storage device 128 and a leaf table within a storage device 130 via a fixed match search pipeline 122. As explained in further detail with reference to FIGS. 2 and 3, the URL address string is parsed into data string elements and the first search key is constructed utilizing the first data string element. As utilized herein, a data string element is a sequence of characters between a pair of pre-designated, typically non-alphanumeric, delimiters.

For example, the URL string http://www.ibm.com/solutions/isc/eprocure.html includes a protocol prefix, http, a first element, www, a second element, ibm, and a third element com. The slash characters "/" and period characters "." serve as delimiters that permit the URL string to be parsed. Together, www.ibm.com form the domain name (sometimes called the "host") that uniquely identifies the server or server front end at which the Webpage solutions resides. The characters following the domain name form the URL path which consists of data specific to the data location scheme implemented. In the above example, the URL path comprising the elements solutions and isc supplies the details of how the specified resource can be accessed within the network.

The present invention as embodied by network processor 100 provides an iterative processing technique whereby incremental full match searches are performed with respect to individual data string elements, resulting in a cumulative longest prefix match result. It should be noted that although in one embodiment of the present invention each character string separated by designated delimiters, including each domain name element, is treated as a distinct element subject to the iterative processing described in further detail below, in an alternative embodiment, the entire domain name may be processed as a single unit. Using the above-mentioned URL string as an example, a simple comparison can be utilized to match the domain name www.ibm.com with a table of the possible domain names. The URL path elements would then be processed in accordance with the iterative processing technique described hereinbelow. Such an implementation would eliminate several iteration cycles and could be efficiently employed within a system having a limited and relatively static number of domain names.

URL pointer 114, under the direction of processor 108, sequentially points to each character within URL string 106 until an entire element has been identified (i.e. a delimiter has been reached) and its binary representation loaded into key register 112. During this process the search key is constructed by adding a bit string consisting of eight bits corresponding to each character from URL string 106. Characters are added to the search key until a delimiter is encountered. The search key is completed when a pattern search prefix is concatenated with the data string element within key register 112. The binary representation of the data string element is padded with zeros out to a fixed length corresponding to the length of the search key and delivered to key register 112. URL pointer 114 is post incremented after each fetch such that after fetching the delimiter that terminates the data string element, it will point to the first alphanumeric character of the next data string element and be ready for the next fall match search iteration.

A search key, k, is delivered from key register 112 to a hash function 116 with the hash key result, h(k), stored in a hash key register 118. Hash function 116 serves to randomize a search key and thus better distribute entries in a lookup table. An exemplary system and method for hashing address strings is disclosed in related U.S. patent application Ser. No. 09/210,222, filed on Dec. 10, 1998, and entitled "Methods, Systems And Computer Program Products For Hashing Address Values," the subject matter of which is incorporated herein by reference. The hash result h(k) is delivered to fixed match search pipeline 122 where it is utilized to locate a corresponding table entry.

Fixed match search pipeline 122 includes a direct table/pattern search control block (DT/PSCB) reader 124 and a leaf reader 126. In accordance with the depicted embodiment DT/PSCB reader 124 utilizes the search key to index into direct table within storage device 128 to find a matching entry. When two or more entries correspond to the same direct table entry, DT/PSCB reader 124 must access one or more PSCBs to resolve those collisions. A linked chain of PSCB pointers is processed until a matching entry is found. The matching entry is typically a pointer to a leaf entry within leaf table within leaf storage device 130. Leaf reader 126 utilizes the pointer determined from either direct table or the PSCB read from storage device 128 to index into a leaf table within leaf storage device 130 to find the matching entry, which is then delivered to comparator 110 for comparison with the original search key.

Following a determination by comparator 110 that the entry from a leaf table within leaf storage device 130 fully matches the search key, a next fall pattern match search is commenced. The contents of key register 112 are replaced with the next data string element within URL string 106. A pattern search prefix is obtained from the result of the last key search and is concatenated with the data string element and the search process as described above is repeated. This iterative process continues until a final search yields no match from fixed match search pipeline 122. Upon determining that no match exists for the current key search, the results of the previous search are delivered to processor 108, which processes the packet associated with URL string 106 in accordance with an instruction corresponding to the final determined matching entry from fixed match search pipeline 122.

A potential design optimization for tree search engine 102 would include defining a new leaf format that fits directly within the direct table structure or PSCB structure of DT/PSCB reader 124. The optimized leaf format utilizes leafs that are smaller than the leaf size specified in conventional look-up definition tables (direct tables). This leaf format contains only the prefix parameter, and would be useful for URL fragments that cannot uniquely identify a server without additional URL elements. Furthermore, this leaf format enables early iterations of the lookup process to finish more rapidly since the data required (i.e., the prefix for the next iteration) is immediately available upon reading the direct table entry (or PSCB in the case of collisions in the direct table). In order to minimize the size of this special "direct leaf", the pattern field is omitted. The implication of omitting the pattern field is that the elements of the URL must be accumulated for a compare operation at the end of the last lookup. The pattern to be compared would then have to be the complete URL string up to the point of route resolution. Skipping the pattern comparison for all but the last iteration will further increase the speed of each iteration.

Figure 2:
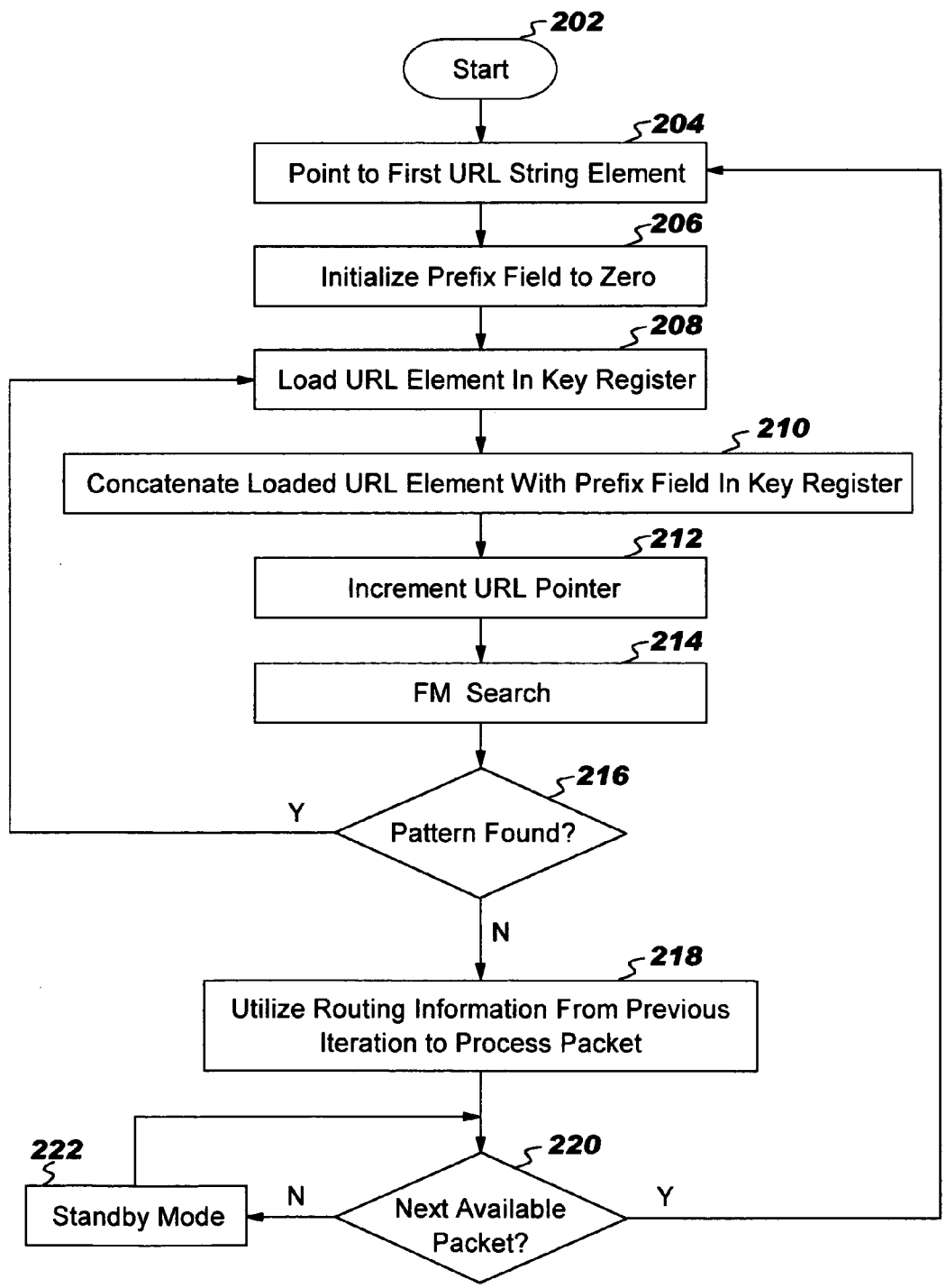
FIG. 2 is a flow diagram depicting steps performed during URL address processing in accordance with a preferred embodiment of the present invention.

Turning to FIG. 2, there is illustrated a flow diagram depicting steps performed during URL string processing in accordance with a preferred embodiment of the present invention. The process begins for a currently unprocessed URL string as shown at step 202, and proceeds to step 204 which depicts pointing to the first URL string element utilizing URL pointer 114. Next, as illustrated at step 206, the prefix parameter is initialized by setting a corresponding prefix field to zero.

Proceeding to step 208, the URL data string element is incrementally loaded into the key register. The contents of the prefix field is then concatenated with the URL data string element within the key register and the URL pointer is incremented as depicted at steps 210 and 212. Next, as illustrated at step 214 a full match search is conducted utilizing the search key. As explained with reference to FIG. 1, the fall match search entails a process by which the search key is first hashed and the resulting hash key is applied to a direct table/tree search mechanism to find a fully matching table entry. In accordance with a preferred embodiment of the present invention, the systems and methods employed to perform the hashing function and the full match search are those disclosed by copending U.S. patent application Ser. No. 09/210,222, filed on Dec. 10, 1998, entitled "Methods, Systems And Computer Program Products For Hashing Address Values," and U.S. patent application Ser. No. 09/543,531, filed on Apr. 6, 2000, entitled "Full Match (FM) Search Algorithm Implementation For A Network Processor," respectively, the subject matters of which are incorporated herein by reference.

The process continues at inquiry step 216, which depicts a determination of whether or not a matching pattern was found. If so, the process returns for the next iteration to step 208 wherein the search key will be incremented to the next URL data string element. If a matching pattern is not found, and as illustrated at step 218, the routing information corresponding to the last successful search iteration is utilized to process the object packet containing the URL string. The process commences a standby mode (step 222) until a next packet URL string is ready for processing as shown beginning at step 220 and returning to step 204.

Figure 3:
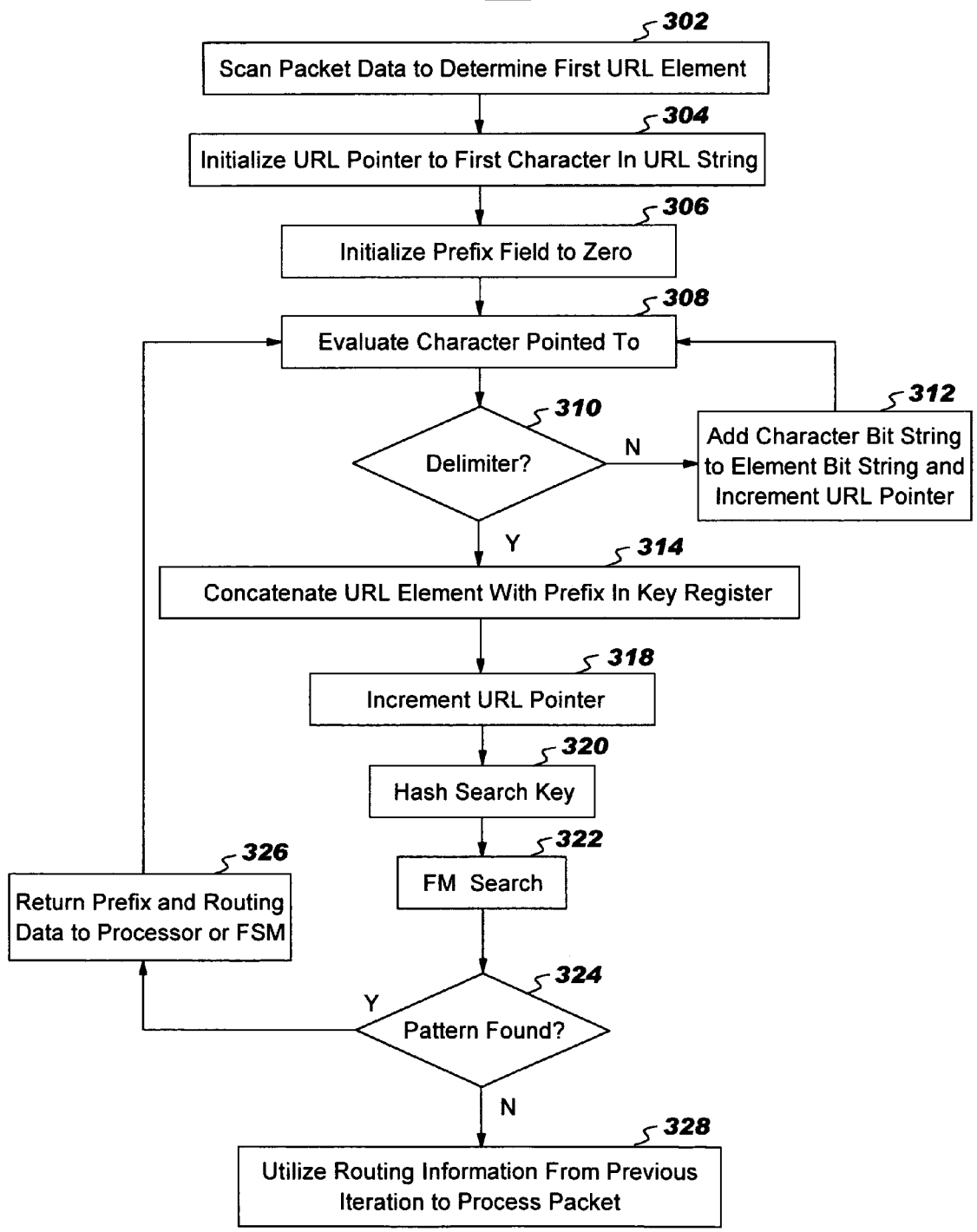
FIG. 3 is a more detailed flow diagram illustrating steps performed during URL address processing in accordance with a preferred embodiment of the present invention.

With reference now to FIG. 3, there is depicted a more detailed flow diagram illustrating steps performed during URL string processing in accordance with a preferred embodiment of the present invention. The URL string processing begins as shown at step 302 with the packet data being scanned by a network processor, such as processor 108, to find the first URL data string element upon which the iterative full match searching will commence. The packet scanning depicted at step 302 is preferably a byte by byte examination of the URL address string characters to locate a predetermined pattern. It should be noted that the first element to be iteratively processed may not be the actual first URL data string element (i.e. the first group of delimited alphanumeric characters). In one embodiment of the present invention in which only one or a few hosts are supported, the host name is recognized during the packet scanning of step 302 and its identity is determined by a simple compare. In an alternate embodiment, the host name is treated as the first data string element to be processed, and is handled just as any other element.

In accordance with the identification of the first URL data string element at step 302, a pointer, such as URL pointer 114, is initialized to the first character in the URL string and the prefix parameter within a prefix field is initialized to zero as shown at steps 304 and 306. Next, as illustrated at step 308, the character pointed to is evaluated to determine whether or not the character is a non-alphanumeric delimiter. If as depicted at steps 310 and 312 the currently evaluated character is not a delimiter, a bit string corresponding to the character is added to the search key element bit string, the pointer is incremented to the next character within the URL string, and the process returns to step 308. This incremental search key generation process continues until a delimiter is encountered and the pattern search prefix from the previous search iteration (NULL for the first iteration) is concatenated with the binary representation of the URL data string element to form the complete search key as illustrated at steps 310 and 314. The pointer is also post incremented after encountering a delimiter as shown at step 318.

Proceeding to step 320, the search key is hashed as described with reference to hash function 116 in FIG. 1, with the resulting hash key utilized to perform a fall match search as depicted at step 322. In accordance with a preferred embodiment, the full match search illustrated at step 322 employs a tree search engine such as tree search engine 102 depicted in FIG. 1. The tree search conducted therein may lead to one of several entries in a tree structure resident within fixed match search pipeline 122. The contents of the tree entry that matches the hash key contain two critical parameters. The first parameter is the identification of the physical server that is addressed in the URL string. This identification may include a Media Access Control (MAC) address, an IP address, a TCP port number, a physical router port, etc. If the iterative URL string processing has not reached the identity of the server, the first parameter of the tree entry may be blank. The second parameter in the tree entry is the pattern search prefix number that is added to the search key at step 314 for the next search.

The pattern search prefix comprises a cumulative history of the search results for the previously processed URL data string elements such that it is possible during each full match search iteration to differentiate for example two URL strings that share a common third element, but have different first and second elements. Among the many possible approaches to assignment of pattern search prefix numbers, one simple method is to assign the prefixes sequentially to each direct table or leaf table tree entry.

As depicted at step 324, if the full match search results in a matching pattern being found, the process proceeds to step 326, wherein the pattern search prefix and routing data resulting from the matching tree entry is delivered to either local memory 104 wherein it can be retrieved and examined by processor 108, or as explained in further detail with reference to FIG. 4, to a dedicated fixed match search state machine. In the former case, processor 108 is notified via an interrupt or status bits of the arrival of new data. Following step 326 the process returns to step 308 wherein the processing of the next search increment (i.e. the next URL data string element) is commenced. Failure to find a matching pattern indicates that the previous search results corresponds to the longest string of URL elements that are uniquely represented within the search tree structure. Therefore, as illustrated at step 328, the routing information from the previous search iteration is utilized to process the packet containing the object URL string.

Figure 4:
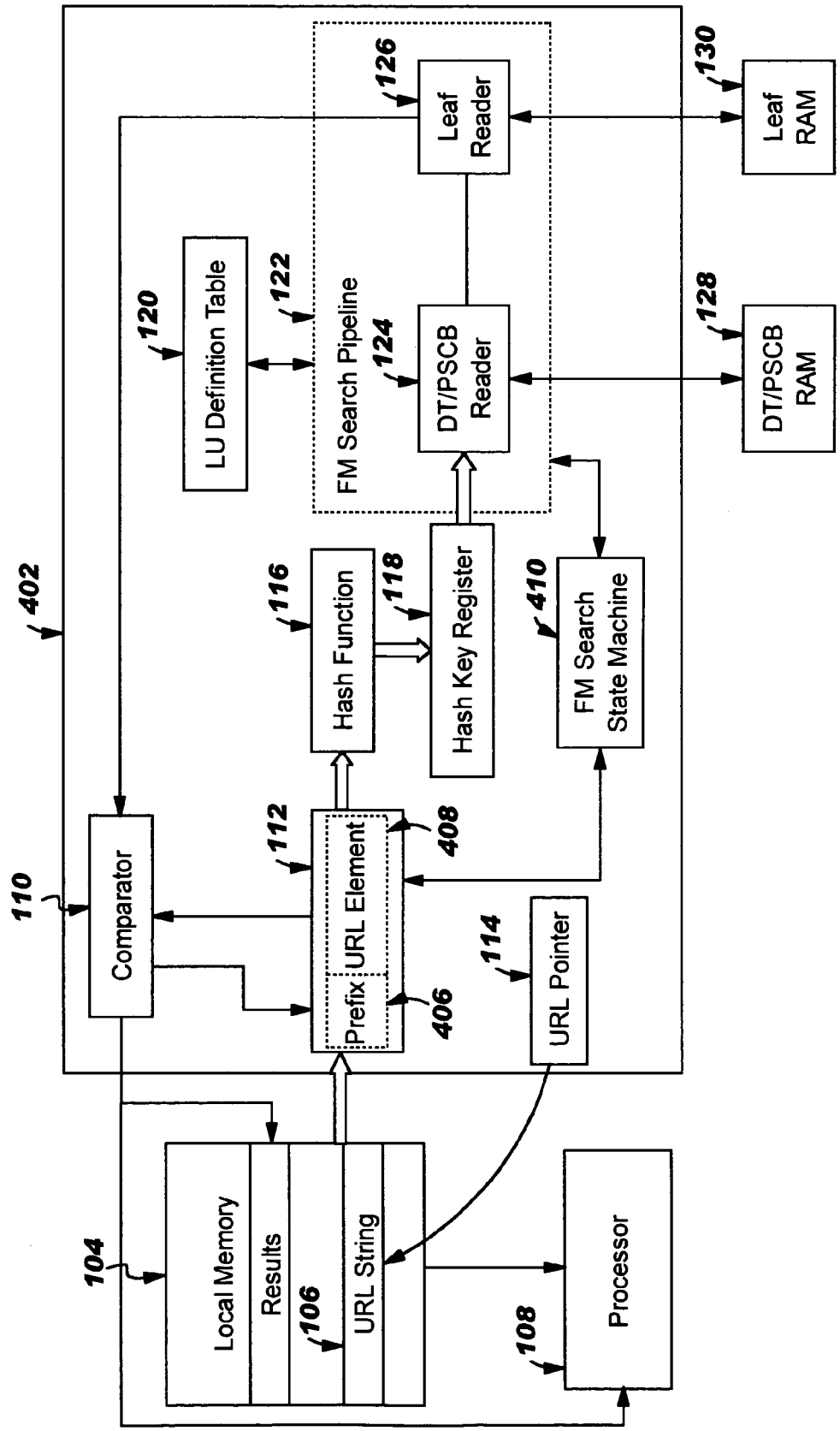
FIG. 4 is a block diagram depicting a network processor including constituent elements of a tree search engine in accordance with a preferred embodiment of the present invention.

Referring to FIG. 4, there is illustrated a block diagram depicting a network processor 400 including constituent elements of a tree search engine in accordance with a preferred embodiment of the present invention. Similar to network processor 100, network processor 400 includes one or more processors 108 each having local memory device 104 within its architecture. A tree search engine 402, modified in accordance with the embodiment depicted in FIG. 4 serves as a complementary coprocessor.

Although data ingress, data egress and other packet processing functionality is not shown in FIG. 4, one skilled in the art will clearly understand that such equipment is essential to and therefore presumably incorporated within the architecture of network processor 400. In accordance with the depicted embodiment, local memory device 104 stores a URL string 106 associated with an IP packet. Tree search engine 402 includes URL pointer 114 that permits tree search engine 402 to scan URL string 106. Processor 108, together with URL pointer 114 perform reading and pointing operations with respect to URL string 106.

As depicted in FIG. 4, tree search engine 402 further comprises a key register 112 that holds a search key constructed from segments of URL string 106. The search key stored within key register 112 is utilized to index into a direct table within storage device 128 and a leaf table within storage device 130 via a fixed match search pipeline 122. As explained in further detail with reference to FIGS. 2 and 3, a first search key is constructed utilizing a first data string element by parsing a URL address string into data string elements as heretofore described. Subsequent search keys are constructed by combining subsequent data string elements with previous search results.

URL pointer 114, under the direction of processor 108, sequentially points to each character within URL string 106 until an entire element has been identified (i.e. a delimiter has been reached) and its binary representation loaded into key register 112. During this process the search key is constructed by adding a bit string consisting of eight bits corresponding to each character of URL string 106. Characters are added to the search key until a delimiter is encountered. The binary representation of the data string element is padded with zeros out to a fixed length corresponding to the length of the search key and delivered to key register 112. Key register 112 includes a URL element field 408 wherein the binary representation of each element is stored, and a prefix field 406 wherein a pattern search prefix is concatenated to the binary URL element. In accordance with the depicted embodiment, a pattern search prefix is delivered from a leaf read from leaf storage device 130 in response to a decision by comparator 110 to prefix field 406 as a hardware implemented operation. The decision from comparator 110 results from comparing the current search key with the pattern stored in the leaf. A successful compare requires the prefix within prefix field 406 to support the next search. This hardware data transfer is an enhancement to the embodiment depicted in FIG. 1, wherein the pattern search prefix is first delivered to processor 108 before being delivered to key register 112.

Comparing network processor 100 of FIG. 1 with network processor 400 of FIG. 4, it should be noted that processing steps 308, 310, 312, 314, 318, and 324 are removed from the software side of processor 108 into hardware implemented within tree search engine 402, controlled by FM search state machine 410.

A search key, k, is delivered from key register 112 to a hash function 116 with the hash key result, h(k), stored in a hash key register 118. Hash function 116 serves to randomize a search key and thus better distribute entries into the lookup table. An exemplary system and method for hashing address strings is disclosed in related U.S. patent application Ser. No. 09/210,222, filed on Dec. 10, 1998, and entitled "Methods, Systems And Computer Program Products For Hashing Address Values," the subject matter of which is incorporated herein by reference. The hash result h(k) is delivered to fixed match search pipeline 122 where it is utilized to locate a corresponding address instruction.

Within fixed match search pipeline 122, DT/PSCB reader 124 utilizes the search key to index into direct table within storage device 128 to find a search tree entry matching the hash key. When two or more entries correspond to the same direct table entry, DT/PSCB reader 124 must access one or more PSCBs to resolve those collisions. A linked chain of PSCB pointers is processed until a matching entry is found. The matching entry is typically a pointer to a leaf entry of a leaf table within leaf storage device 130. Leaf reader 126 utilizes the pointer determined from either direct table or the PSCB read from storage device 128 to index into a leaf table within leaf storage device 130 to find the matching entry, which is then delivered to comparator 110 for comparison with the original search key.

Following a determination by comparator 110 that the entry from the leaf table within leaf storage device 130 fully matches the search key, a next fall pattern match search is commenced. The contents of URL element 408 within key register 112 are replaced with the next data string element within URL string 106. A pattern search prefix is obtained from the result of the last key search and is concatenated with the data string element by loading the pattern search prefix into prefix field 406. The search process as described above is then repeated. This iterative process continues until a final search yields no match from fixed match search pipeline 122. Upon determining that no match exists for the current key search, the results of the previous search are delivered from local memory 104 to processor 108, which processes the packet associated with URL string 106 in accordance with an instruction sequence corresponding to the final determined matching entry from fixed match search pipeline 122. In accordance with the preferred embodiment depicted in FIG. 4, tree search engine 402 includes a full match state machine 410 comprising hardware and software processing components for implementing the steps depicted in FIGS. 2 and 3 that would otherwise be performed by processor 108.

A method and system has been disclosed for processing a URI character string within a network processor. Software written according to the present invention is to be stored in some form of computer readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

While the invention has been particularly shown and described with reference to a preferred embodiment, it will be understood by those skilled in the art that various changes in form and detail may be made therein without departing from the spirit and scope of the invention.

What is claimed is:

1. A system for performing a pattern match search for a data string having a plurality of characters separated by delimiters, said system comprising:
   means for defining a subset of characters as delimiters such that all remaining characters are defined as non-delimiters;
   means for constructing a search key by:
      generating a full match search increment comprising the binary representation of a data string element, wherein said data string element includes a plurality of non-delimiters between a pair of delimiters; and
      concatenating a pattern search prefix to said full match search increment to form said search key, wherein said pattern search prefix is a cumulative pattern search result of all previous full match search increments;
   means for performing a fill match search within a lookup table utilizing said search key;
   means for returning to said constructing a search key, in response to finding a matching pattern within said lockup table; and
   means for utilizing the previous full match search result to process said data string, in response to not finding a matching pattern within said lookup table.

2. The system of claim 1, wherein said system further includes processing means for pointing to a character within said data string prior to constructing a search key.

3. The system of claim 2, wherein said processing means for constructing a search key further comprises:
   means for evaluating said character to determine whether or not said character is a delimiter;
   means responsive to said character being a delimiter for:
      delivering a full match search increment into a search key register, wherein said search increment comprises a binary representation of all non-delimiters between said delimiter and an immediately preceding delimiter; and
      concatenating said pattern search prefix to said search increment within said search key element;
   means responsive to said character not being a delimiter for appending a binary representation of said character to said search increment; and
   means for incrementing said pointer.

4. The system of claim 1, wherein said system further includes means for incrementing said search key to a next URL data string element, in response to finding said matching pattern.

5. The system of claim 1, wherein said means for performing a full match search further comprises:
   means for determining whether or not a full match for said search key exists within said hash table by:
      hashing said search key to produce a hash key result;
      indexing a hash table utilizing said hash key result to find a matching stored pattern; and
      resolving collisions in said hash table utilizing a pattern search control block.

6. The system of claim 1, wherein said data string is a Universal Resource Indicator address, and said data string element is a URI element.

7. The system of claim 6, wherein said delimiters include period characters or slash characters.

8. The system of claim 6, wherein said means for constructing a search key further comprises:
    means for scanning an IP data packet to determine a first URI element to by parsed;
    means for initializing a URI pointer to a first character within said first URI element; and
    means for initializing said pattern search prefix to zero.

9. A computer program product for performing a pattern match search for a data string having a plurality of characters separated by delimiters, said computer program product comprising:
    instruction means for defining a subset of characters as delimiters such that all remaining characters are defined as non-delimiters;
    instruction means for constructing a search key by:
        generating a full match search increment comprising the binary representation of a data string element, wherein said data string element includes a plurality of non-delimiters between a pair of delimiters; and
        concatenating a pattern search prefix to said full match search increment to form said search key, wherein said pattern search prefix is a cumulative pattern search result of all previous full match search increments;
    instruction means for performing a full match search within a lookup table utilizing said search key;
    instruction means for returning to said constructing a search key, in response to finding a matching pattern within said lookup table; and
    instruction means for utilizing the previous full match search result to process said data string, in response to not finding a matching pattern within said lookup table.

10. The computer program product of claim 9, wherein said computer program product further includes instruction means for pointing to a character within said data string prior to constructing a search key.

11. The computer program product of claim 10, wherein said instruction means for constructing a search key further includes:
    instruction means for evaluating said character to determine whether or not said character is a delimiter;
    instruction means responsive to said character being a delimiter for:
        delivering a full match search increment into a search key register, wherein said search increment comprises a binary representation of all non-delimiters between said delimiter and an immediately preceding delimiter; and
        concatenating said pattern search prefix to said search increment within said search key element;
    instruction means responsive to said character not being a delimiter for appending a binary representation of said character to said search increment; and
    instruction means for incrementing said pointer.

12. The computer program product of claim 9, wherein said computer program product further includes instruction means for incrementing said search key to a next URL data string element, in response to finding said matching pattern.

13. The computer program product of claim 9, wherein said instruction means for performing a fall match search further includes:
    instruction means for determining whether or not a full match for said search key exists within said hash table by:
        hashing said search key to produce a hash key result;
        indexing a hash table utilizing said hash key result to find a matching stored pattern; and
        resolving collisions in said hash table utilizing a pattern search control block.

14. The computer program product of claim 9, wherein said data string is a Universal Resource Indicator address, and said data string element is a URI element.

15. The computer program product of claim 14, wherein said delimiters include period characters or slash characters.

16. The computer program product of claim 14, wherein said instruction means for constructing a search key further includes:
    instruction means for scanning an IP data packet to determine a first URI element to by parsed;
    instruction means for initializing a URI pointer to a first character within said first URI element; and
    instruction means for initializing said pattern search prefix to zero.

* * * * *

UNITED STATES PATENT AND TRADEMARK OFFICE
CERTIFICATE OF CORRECTION

PATENT NO. : 7,054,855 B2 Page 1 of 1
APPLICATION NO. : 09/898253
DATED : May 30, 2006
INVENTOR(S) : Basso et al.

It is certified that error appears in the above-identified patent and that said Letters Patent is hereby corrected as shown below:

Column 10, line 27, delete "lockup" and insert --lookup--.

Column 12, line 17, delete "fall" and insert --full--.

Signed and Sealed this

Fourteenth Day of November, 2006

JON W. DUDAS
*Director of the United States Patent and Trademark Office*